United States Patent [19]
Kai et al.

[11] Patent Number: 5,463,679
[45] Date of Patent: Oct. 31, 1995

[54] PUBLIC TELEPHONE SYSTEM

[75] Inventors: Osamu Kai; Junichi Muroi; Nobuo Suzuki; Tatsumi Takagi, all of Tokyo; Shigekazu Sakata; Hideyuki Oikawa, both of Saitama, all of Japan

[73] Assignees: Tamura Electrics Works, Ltd.; Kokusai Denshin Denwa Co., Ltd., both of Tokyo, Japan

[21] Appl. No.: 233,639

[22] Filed: Apr. 26, 1994

[30] Foreign Application Priority Data

Apr. 27, 1993 [JP] Japan .................................. 5-122102
Apr. 27, 1993 [JP] Japan .................................. 5-122103

[51] Int. Cl.$^6$ ......................... H04M 17/00; H04M 3/00
[52] U.S. Cl. ........................................... 379/145; 379/189
[58] Field of Search ............................... 379/91, 95, 143, 379/144, 145, 154, 123, 132, 189

[56] References Cited

U.S. PATENT DOCUMENTS 4,731,818  3/1988  Clark, Jr. et al. .................. 379/144
4,995,942  12/1990  Zebryk .................................. 379/91

*Primary Examiner*—Stephen Chin
*Assistant Examiner*—Kevin Kim
*Attorney, Agent, or Firm*—Graham & James

[57] ABSTRACT

A public telephone system includes public telephone sets assigned with different specific numbers and allowing speech communication using cards and a center apparatus connected to the public telephone sets through a telephone line. The center apparatus includes a list number forming unit for forming one list number from numbers of a plurality of invalid cards produced by illegally rewriting the cards, a registering unit for registering each formed list number in association with a series number, management number, and telephone number of each of the telephone sets, a storage unit for storing the list number and the series number, management number, and telephone number of each telephone set, all of which are registered by the registering unit, and a list number transmitting unit for calling, through the telephone line, each public telephone set corresponding to the telephone number registered in the storage unit and transmitting a list number corresponding to each telephone set. Each public telephone set includes a controller for controlling on the basis of the list number whether speech communication is allowed in use of a card.

7 Claims, 5 Drawing Sheets

| NO. | CARD NO. (UPPER LIMIT) | CARD NO. (LOWER LIMIT) |
|---|---|---|
| 1 | ○ ○ ○ --- ○ | ○ ○ ○ --- ○ |
| 2 | ○ ○ ○ --- ○ | ○ ○ ○ --- ○ |
| 3 | ○ ○ ○ --- ○ | ○ ○ ○ --- ○ |

FIG. 5A

| NO. | MANAGEMENT NUMBER | TELEPHONE NUMBER | INVALID CARD LIST NO. |
|---|---|---|---|
| 1 | ○ ○ ○ --- ○ | ○ ○ ○ --- ○ | $a_1, a_2, a_3$ |
| 2 | ○ ○ ○ --- ○ | ○ ○ ○ --- ○ | $b_1, b_2$ |
| 3 | ○ ○ ○ --- ○ | ○ ○ ○ --- ○ | $c_1, c_2$ |

FIG. 5B

PUBLIC TELEPHONE SYSTEM

BACKGROUND OF THE INVENTION

The present invention relates to a public telephone system comprising a center apparatus and a public telephone set (to be referred to as a telephone set hereinafter) for allowing speech communication using a card, wherein speech communication is inhibited when an invalid card which is illegally rewritten is used in the telephone set.

In a telephone set for allowing speech communication using a card such as a telephone card, to prevent speech communication using a so-called invalid card which is illegally rewritten, the following management for invalid cards has been performed. That is, it is uneconomical to store all invalid card numbers in a memory of each telephone set because the memory capacity of each telephone set becomes very large. For this reason, a memory is arranged in a center apparatus for managing all the telephone sets, and the numbers of invalid cards supposed to be illegally used in each telephone set are registered in the memory in correspondence with each telephone set and managed. A corresponding invalid card number is transmitted to each telephone set through a telephone line and stored in the memory of each telephone set.

When a card is inserted in a telephone set to make a call, the telephone set reads the card number of this inserted card to collate with the invalid card numbers registered in the memory. If the number of the inserted card coincides with one of the registered invalid card numbers, transmission is inhibited.

In the conventional invalid card management, since the center apparatus manages all the invalid card numbers of the telephone sets on the center apparatus side, the memory capacity of the center apparatus becomes very large, resulting in an economical disadvantage. Memory retrieval in registering and reading invalid card numbers in the center apparatus is undesirably time-consuming because the memory capacity is very large.

In registering invalid card numbers in each telephone set, the invalid card numbers are sequentially transmitted from the center apparatus to each telephone set. At the same time, to confirm the invalid card numbers registered in each telephone set, this telephone set is called to allow the center apparatus to receive the invalid card numbers therefrom. For this reason, in the center apparatus and the telephone set, a data transmission time in transmission of the invalid card numbers is undesirably prolonged, and the telephone set cannot be used for the speech communication as its primary purpose during the data transmission time.

SUMMARY OF THE INVENTION

It is an object of the present invention to provide a public telephone system capable of reducing the memory capacity in a center apparatus and efficiently performing memory retrieval in registering invalid card numbers.

It is another object of the present invention to provide a public telephone system capable of shortening a data transmission time between the center apparatus and each telephone set to assure a time used for speech communication as the primary purpose of the telephone set.

In order to achieve the above objects of the present invention, there is provided a public telephone system comprising public telephone sets assigned with different specific numbers and allowing speech communication using cards, and a center apparatus connected to the public telephone sets through a telephone line, the center apparatus comprising list number forming means for forming one list number from numbers of a plurality of invalid cards produced by illegally rewriting the cards, registering means for registering each formed list number in association with a series number, management number, and telephone number of each of the telephone sets, a storage unit for storing the list number and the series number, management number, and telephone number of each telephone set, all of which are registered by the registering means, and list number transmitting means for calling, through the telephone line, each public telephone set corresponding to the telephone number registered in the storage unit and transmitting a list number corresponding to each telephone set, and each public telephone set comprising control means for controlling on the basis of the list number whether speech communication is allowed in use of a card.

BRIEF DESCRIPTION OF THE DRAWINGS

FIG. 5A is a view for explaining an invalid card list number generated by the center apparatus; and FIG. 5B is a view for explaining a management table generated by the center apparatus.

DESCRIPTION OF THE PREFERRED EMBODIMENTS

Figure 1:
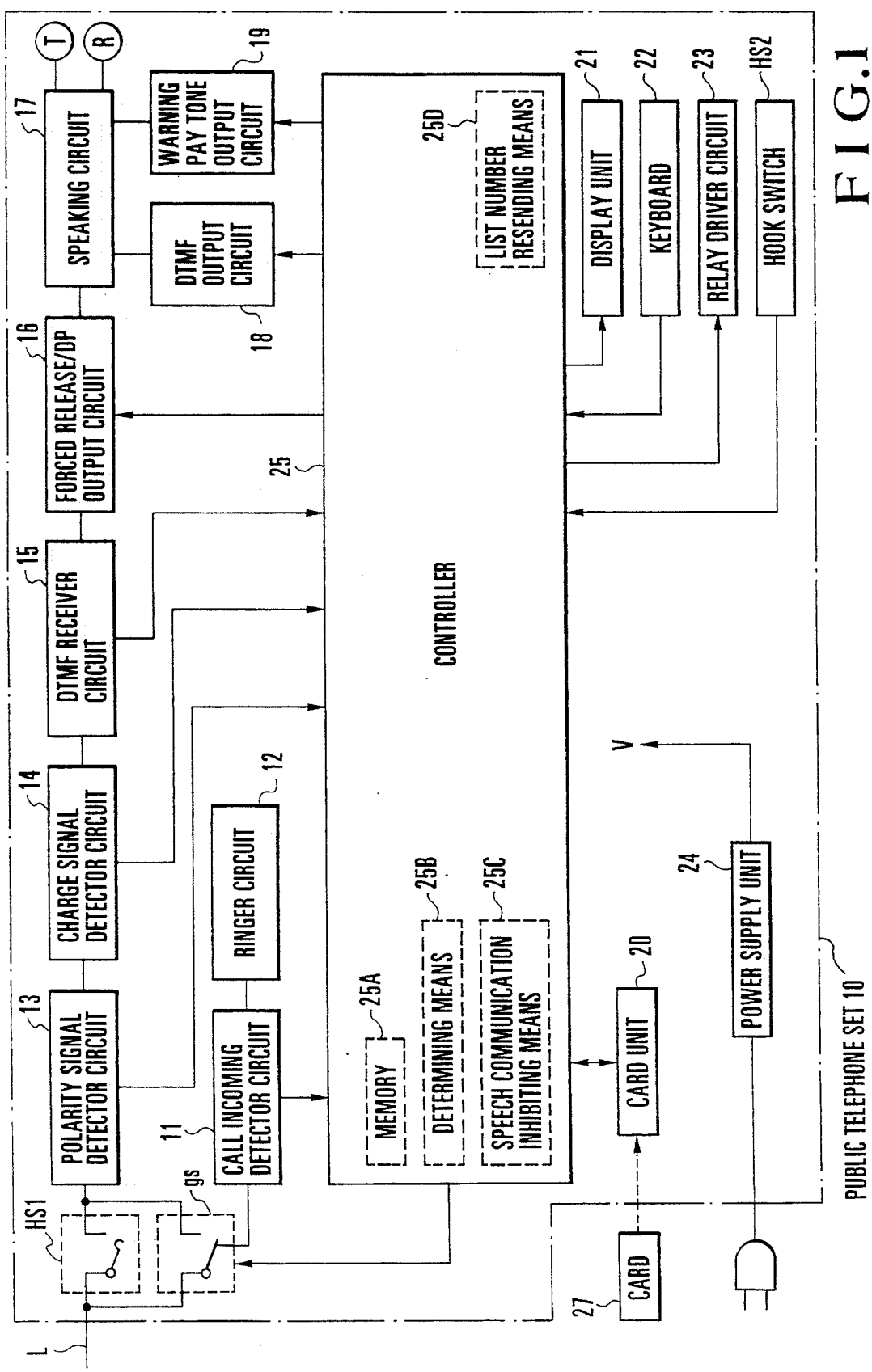
FIG. 1 is a block diagram showing a public telephone set constituting a public telephone system according to an embodiment of the present invention.

FIG. 1 shows a public telephone system according to an embodiment of the present invention, and more particularly a telephone set 10 constituting this system.

Referring to FIG. 1, reference numeral 11 denotes a call incoming detector circuit for detecting a call incoming to a telephone line (to be referred to a line hereinafter) L; 12, a ringer circuit for performing a call incoming operation and ringing in accordance with a call incoming signal; 13, a polarity detector circuit for detecting the polarity of the line L which is caused by a response of a partner or the like; 14, a charge signal detector circuit for detecting a charge signal; 15, a DTMF receiver circuit for receiving a DTMF signal received to the line L; 16, a forced release/DP output circuit for forcibly releasing the loop of the line L and at the same time outputting a dial pulse (DP) signal to the line L; and 17, a speaking circuit 17.

Reference numeral 18 denotes a DTMF output circuit for outputting a DTMF signal to the line L; 19, a warning pay tone output circuit for outputting a warning pay tone when the balance becomes zero; 20, a card unit for performing various processes for a card 28 such as a telephone card inserted into the telephone set; 21, a display unit; 22, a keyboard including dial keys; 23, a relay driver circuit; 24, a power supply unit for supplying a power supply voltage to each part of the telephone set; and 25, a controller, having a memory (not shown), for controlling each component. Reference symbols HS1 and HS2 denote hook switches; and gs, a relay.

Upon reception of a call incoming from a center apparatus (to be described in detail later), the telephone set 10 responds to this call. At the same time, the telephone set 10 receives and stores an invalid card list number as a list of illegally rewritten cards sent from the center apparatus. When a card is inserted into the card unit 20, the telephone set 10 detects the card number of this inserted card, collates this card number with the invalid card list number, and inhibits speech communication if the inserted card is determined as an invalid card.

Figure 2:
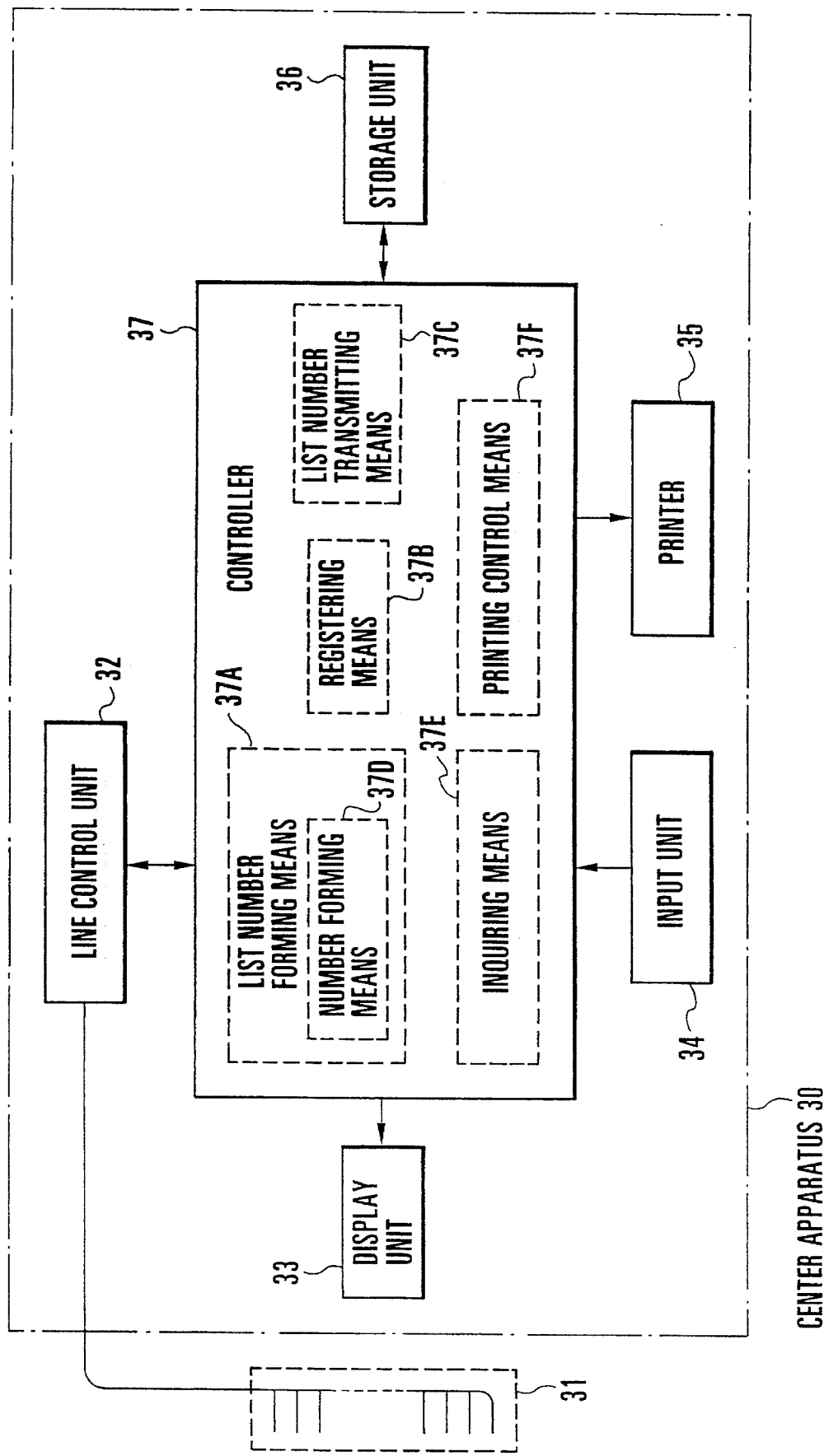
FIG. 2 is a block diagram of a center apparatus constituting the public telephone system.

FIG. 2 shows a center apparatus 30 constituting this public telephone system.

Referring to FIG. 2, reference numeral 32 denotes a line control unit for performing call originating control and call incoming control for lines 31; 33, a display unit; 34, an input unit such as a keyboard; 35, a printer for printing out information; 36, a storage unit; and 37, a controller for controlling these components.

To prevent illegal speech communication in the telephone set 10 using the invalid card, the center apparatus 10 forms an invalid card list and an invalid card list management table (to be referred to as a management table hereinafter) for managing this invalid card list for each telephone set. The center apparatus 30 transmits the invalid card list to each telephone set in accordance with the formed management table.

FIGS. 5A and 5B show an invalid card list and a management table, respectively.

When invalid card list numbers (invalid card list Nos.) 1, 2, 3, . . . on the invalid card list are to be set, the controller 37 in the center apparatus 30 sets card Nos. (card numbers), i.e., upper and lower limit values of a plurality of continuous invalid card numbers as one list number in the storage unit 36, as shown in FIG. 5A.

To set the contents of the management table, management numbers, telephone numbers, and invalid card list numbers of the respective telephone set numbers (series Nos.) 1, 2, 3, . . . are set in the storage unit 36, as shown in FIG. 5B.

Figure 3:
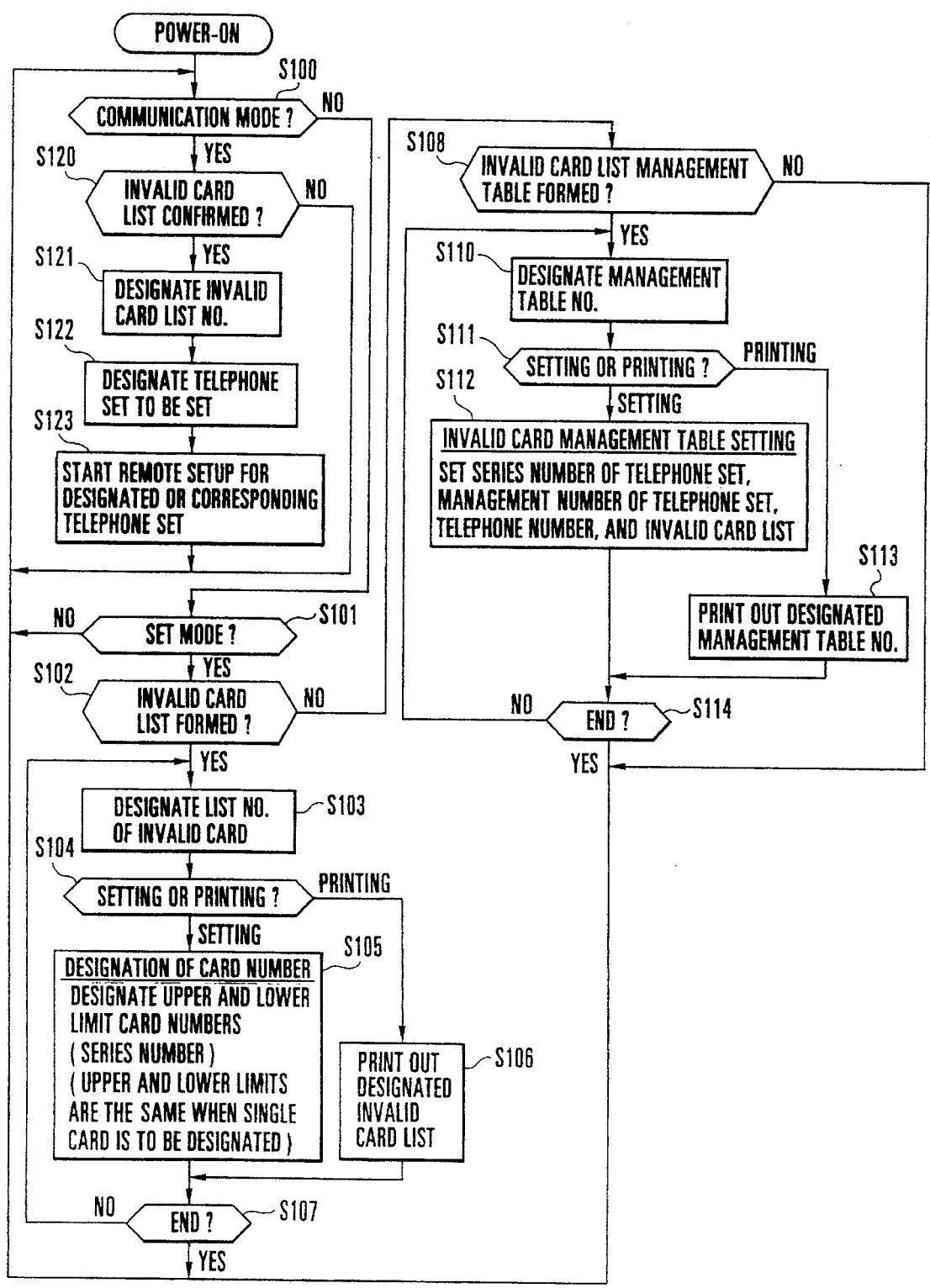
FIG. 3 is a flow chart showing an operation of the center apparatus.

FIG. 3 shows the operation of the controller 37 in the center apparatus 30 for managing the invalid cards. The main operation of the present invention will be described with reference to the flow chart in FIG. 3.

When the center apparatus 30 is powered on, and the controller 37 is started, the controller 37 determines "Communication Mode?" in step S100 and "Set Mode?" in step S101. When an operation for setting invalid cards is performed at the input unit 34, the controller 37 determines to be YES in "Set Mode?" of step S101 and "Invalid Card List Formed?" of step S102. In this case, the controller 37 inputs the invalid card list number designated at the input unit 34 in step S103. The controller 37 then determines in step S104 upon reception of operation information from the input unit 34 whether a card number corresponding to the designated invalid card list number is set or printing is performed.

If the controller 37 determines from the operation information at the input unit 34 that the invalid card list is to be set, the upper and lower limit values of the series numbers of the cards recognized as invalid cards are input and designated in step S105, and the controller 37 forms the list shown in FIG. 5A together with the invalid card list numbers designated by these values. The resultant invalid card list numbers and the list are stored in the storage unit 36, and the flow advances to step S107. Note that if one invalid card is to be set, a card number whose upper limit value is equal to the lower limit value is designated in that list. In this manner, a plurality of invalid card numbers are set as one invalid card list number, so that the memory capacity of the storage unit 36 can be reduced.

When the controller 37 determines from the operation information at the input unit 34 that the designated invalid card list numbers are to be printed out, the controller 37 reads out the designated invalid card list numbers and the card numbers respectively corresponding to the invalid card list numbers from the storage unit 36 in step S106. The controller 37 then drives the printer 35 to print out the desired information, and the flow advances to step S107.

The controller 37 determines in step S107 whether the invalid card numbers are set or the printing operation is completed. If the invalid card numbers are to be still set or the printing operation is not completed, the flow returns to step S103. An invalid card list number to be designated next is input, and the upper and lower limit values of the card number corresponding to this list number are set in step S105 or information is printed out in step S106.

When the invalid card list numbers are completely set, the controller 37 forms a management table for managing the invalid card list for each telephone set. More specifically, when a predetermined operation is performed at the input unit 34, and the controller 37 determines to be YES in "Invalid Card List Management Table Formed?" of step S108, the controller 37 inputs a management table number serving as a telephone number series number designated by the operation at the input unit 34 in step S110. The controller 37 then receives the operation information from the input unit 34 to determine in step S111 whether the contents of the designated management table are set or the contents of this management table are printed out.

When the controller 37 determines that the management table is to be set, the controller 37 forms the telephone management number, the telephone number of the telephone set, and invalid card list used for this telephone set in correspondence with the designated management table number as a management table, as shown in FIG. 5B. The resultant management table is stored in the storage unit 36, and the flow then advances to step S114.

As described above, a management table in which an invalid card list number or numbers are set is set for each telephone set. The memory capacity of the storage unit 36 in the center apparatus can be saved, and at the same time, the invalid card numbers can be easily registered in each telephone set. As will be described later, to confirm the contents of invalid cards set in each telephone set, the contents can be easily confirmed on the basis of the management table.

When the controller 37 determines from the operation information at the input unit 34 that the contents of the management table are to be printed out and determines NO in step S111, the controller 37 reads out the designated management table number, the management number corresponding to this table number, the telephone number, and the invalid card list numbers from the storage unit 36 in step S113. The printer 35 is driven to print out the readout contents, and the flow advances to step S114.

The controller 37 determines in step S114 whether the management table is set or printing is completed. If the management table is to be still set or printing is not completed, the flow returns to step S110 to input a management table number to be designated next. At the same time, the telephone number corresponding to this table number, the invalid card list numbers, and the like are set, or these pieces of information are printed out.

When the invalid card list and the management table are completely formed, and a predetermined operation is performed at the input unit 34 to transmit these pieces of information to each telephone set, the controller 37 determines to be YES in "Communication Mode?" of step S100.

In this case, when an invalid card list is present in each telephone set and the controller 37 determines to be YES in "Invalid Card List Set?" of step S120, the controller 37 designates invalid card list numbers to be transmitted to each telephone set in step S121. In step S122, the controller 37 designates the telephone set for setting this list number on the basis of the management table. In step S123, the controller 37 starts remote setup for transmitting and setting the invalid card list numbers or the invalid card list having numbers representing the upper and lower limit values of a plurality of invalid card numbers.

As described above, all the invalid card numbers represented by the invalid card list are temporarily transmitted to each telephone set. When the controller 37 periodically inquires the invalid card numbers held in each telephone set, this telephone set need not transmit all the invalid card numbers, but transmits only the invalid card list number, thereby greatly shortening the transmission time. In this case, the center apparatus 20 can retrieve the invalid card list using the invalid card list numbers registered in the management table of the source telephone set. The center apparatus 20 can easily confirm the invalid card numbers on the retrieved invalid card list.

Figures 4A, 4B:
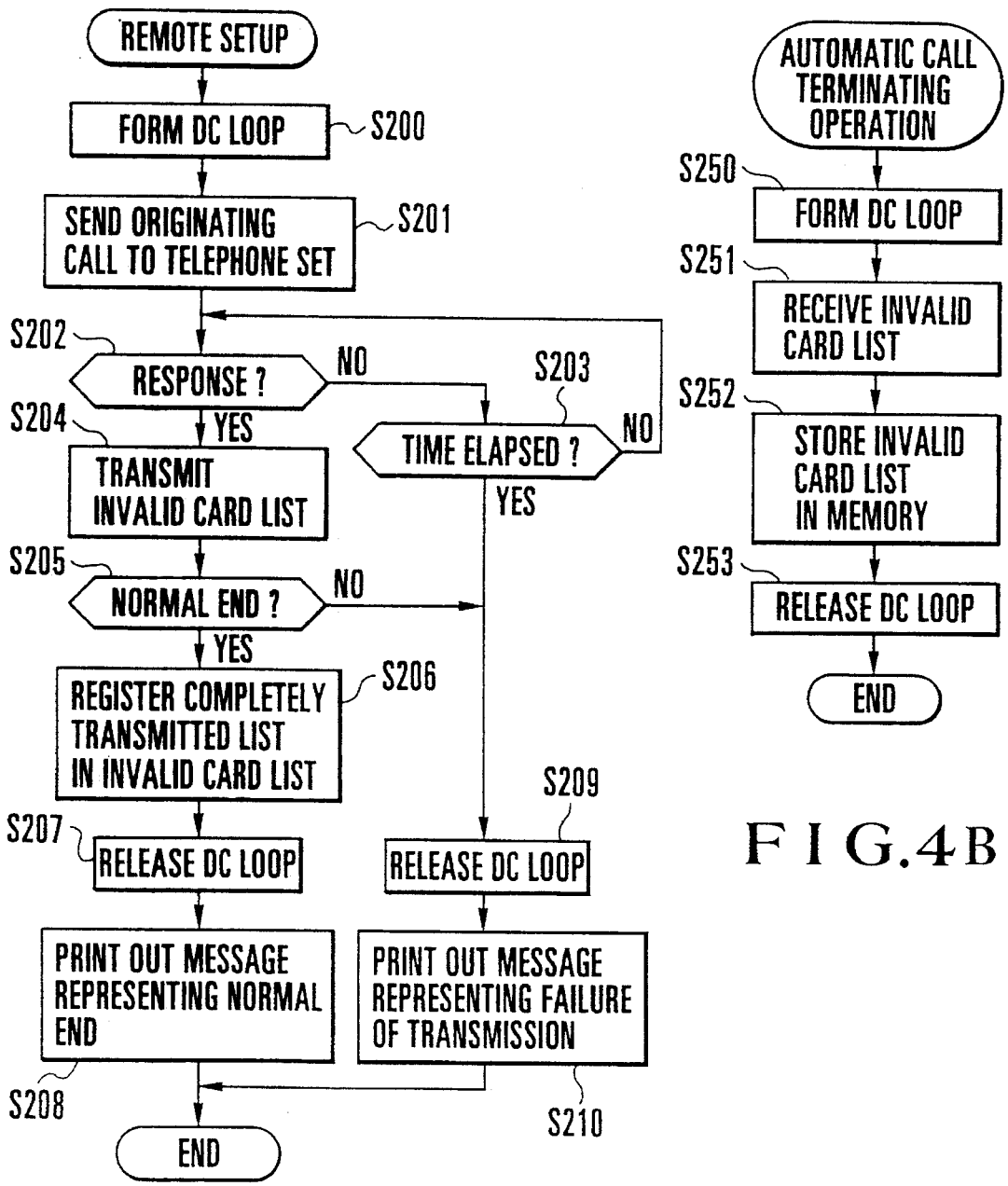
FIG. 4A is a flow chart showing a call originating operation of the center apparatus.
FIG. 4B is a flow chart showing a receiving operation of the public telephone set.

FIG. 4A shows the detailed remote setup operation of an invalid card list for each telephone set. More specifically, the controller 37 controls a line control unit 32. In step S200, the controller 37 captures any one of the lines 31 to form a DC loop. In step S201, the controller 37 outputs, as a dial signal, the telephone number of the telephone set corresponding to the designated invalid card list in the management table to the captured line to call the partner telephone set. At this time, a timer having a predetermined period of timer time is started.

In this case, when the partner telephone set responds to the call to cause the controller 37 to determine YES in step S202, the controller 37 transmits the designated invalid card list as a DTMF signal from the line control unit 32 to the partner telephone set in step S204. The controller 37 then determines in step S205 whether a transmitting operation is normally completed. If YES in step S205, the controller 37 registers the list number in the invalid card list upon the transmitting operation. In step S207, the controller 37 releases the DC loop. In step S208, the controller 37 drives the printer 35 to print out a message representing the end of normal transmission of the invalid card list.

As described above, when transmission of the invalid card list to a given telephone set is completed, the next telephone set is designated to cause the center apparatus to transmit the corresponding invalid card list.

Upon a call originating operation to a telephone set, when the time of the timer has elapsed in step S203 due to non-response of the telephone set, or if NO in step S205 due to abnormal transmission of the invalid card list, the controller 37 releases the DC loop in step S209 and drives the printer 35 in step S210, thereby printing out a message representing the failure of transmission.

FIG. 4B shows the operation of the controller 25 in the telephone set 10 responding to the operation of the center apparatus 30.

More specifically, when a terminating call is received from the center apparatus 30, the controller 25 drives the relay gs to capture the line L, thereby forming a DC loop in step S250. The DTMF signal representing the invalid card list transmitted from the center apparatus 30 is received through the DTMF receiver 14.

The received invalid card list is stored in a memory 25A in the controller 25 in step S252. At the same time, the controller 25 turns the relay gs off to release the DC loop of the line L.

Subsequently, when a card is inserted into this telephone set, the controller 25 reads the card number and collates it with the contents of the invalid card list stored in the memory 25A. If the read card number coincides with one of the invalid card numbers in the invalid card list, the controller 25 inhibits a call originating operation; otherwise, the controller 25 allows a call originating operation.

As has been described above, according to the present invention, the center apparatus forms one list number from the numbers of a plurality of invalid cards which are illegally rewritten. At the same time, the center apparatus stores each list number in correspondence with the series number, management number, and telephone number of each public telephone set. The center apparatus calls the public telephone set corresponding to the telephone number and transmits the corresponding list number thereto. The memory capacity of the center apparatus can be reduced. Therefore, retrieval in the storage unit of the center apparatus can be highly efficiently performed, a time for transmitting data to each public telephone set can be shortened, and a time required for speech communication as the primary purpose of the public telephone set can be assured.

The upper and lower limit numbers of the consecutive numbers of a plurality of invalid cards are formed as one list number. When a plurality of cards newly issued and having consecutive numbers are illegally rewritten, the numbers of the plurality of invalid cards can be defined as one list number. Therefore, invalid card management in the center apparatus and each public telephone set can be facilitated.

When each list number transmitted from the center apparatus is stored in a memory, and the number of a card used in a public telephone set coincides with one of the invalid card numbers in the list number, speech communication is inhibited. The capacity of the memory for storing the invalid card numbers in the public telephone set can be reduced. Therefore, the memory retrieval in each public telephone set in use of a card can be highly efficiently performed.

The center apparatus periodically inquires the list number to each public telephone set. This public telephone set sends back the list number in the memory in response to this inquiry. Therefore, the center apparatus can easily confirm the list number stored in each public telephone set.

The center apparatus prints out each list number stored in the memory and the series number, management number, and telephone number of each public telephone set. The center apparatus can easily detect the relationship between the respective telephone sets and the respective list numbers registered therein.

Upon completion of transmission of the list number to each public telephone set, this list number is stored in the storage unit of the center apparatus. Therefore, different list numbers will not be transmitted to a single public telephone set.

What is claimed is:

1. A public telephone system comprising:

public telephone sets for performing speech communication by using cards assigned with a series of card numbers; and a center apparatus, connected to said public telephone sets through a telephone line, for managing as invalid card numbers, the card numbers of invalid cards to prevent the speech communication by means of the invalid cards, said center apparatus comprising card list forming means for forming a plurality of card lists each having at least one set of upper and lower limit numbers specifying consecutive invalid card numbers, said card list forming means including a list number forming means for assigning card list numbers to sets of the upper and lower limit numbers of a card list, respectively, management table forming means for forming a management table in which the card list numbers from said card list forming means are associated with management numbers of said telephone sets to which the card list numbers are to be sent, a storage unit for storing the card list from said card list forming means and the management table from said management table forming means, and transmitting means for transmitting the corresponding sets of the upper and lower limit numbers to said telephone sets, through the telephone line, in accordance with the management table stored in said storage unit, each of said public telephone sets comprising a memory for storing at least one set of the upper and lower limit numbers transmitted by said transmitting means, and control means for controlling on the basis of the set of the upper and lower limit numbers stored in said memory whether speech communication is allowed in use of the cards.

2. A system according to claim 1, wherein said control means comprises determining means for determining whether a card number is included in the set specified by the upper and lower limit numbers stored in said memory, and speech communication inhibiting means for inhibiting speech communication on the basis of an affirmative output from said determining means.

3. A system according to claim 1, wherein the set of the upper and lower limit numbers transmitted from said center apparatus to each of said telephone sets and stored in said memory includes the card list numbers.

4. A system according to claim 3, further comprising enquiring means, provided in said center apparatus, for periodically interrogating the card list number stored in said memory of said telephone sets, and card list number sending means, providing in said each public set, for sending the card list numbers back to said center apparatus in response to an inquiry from said enquiring means.

5. A system according to claim 1, further comprising a printing means, provided in said center apparatus, for printing the card list and the management table stored in said storage unit.

6. A system according to claim 1, wherein when a card number of one invalid card is to be set, said card list forming means assigns the card number of the invalid card to the upper and lower limit numbers in common.

7. A public telephone system comprising:

public telephone sets for performing speech communication by using cards assigned with a series of card numbers; and a center apparatus, connected to said public telephone sets through a telephone line, for managing as invalid card numbers, the card numbers of invalid cards to prevent the speech communication by means of the invalid cards, said center apparatus comprising card list forming means for forming at least one card list having a plurality of sets of upper and lower limit numbers specifying consecutive invalid card numbers, management table forming means for forming a management table in which the sets of the upper and lower limit numbers from said card list forming means are associated with management numbers of said telephone sets to which the card list numbers are to be sent, a storage unit for storing the card list from said card list forming means and the management table from said management table forming means, and transmitting means for transmitting the corresponding sets of the upper and lower limit numbers to said telephone sets, through the telephone line, in accordance with the management table stored in said storage unit, each of said public telephone sets comprising a memory for storing at least one set of the upper and lower limit numbers transmitted by said transmitting means, and control means for controlling on the basis of the set of the upper and lower limit numbers stored in said memory whether speech communication is allowed in use of the cards, said control means comprising determining means for determining whether a card number is included in the set specified by the upper and lower limit numbers stored in said memory, and speech communication inhibiting means for inhibiting speech communication on the basis of an affirmative output from said determining means.

* * * * *